United States Patent [19]

Lespagnol et al.

[11] Patent Number: 4,885,744

[45] Date of Patent: Dec. 5, 1989

[54] APPARATUS FOR RECONSTRUCTING AND MULTIPLEXING FRAMES OF VARIOUS ORIGINS MADE UP OF A VARIABLE NUMBER OF PACKETS OF FIXED LENGTH

[76] Inventors: Albert Lespagnol, 33, rue de Landerval; Jean-Paul Quinquis, Rue de Cornic, both of 22700 Perros-Guirec; Jacques Kerberenes, Kerlan, Servel, 22300 Lannion, all of France

[21] Appl. No.: 207,132

[22] Filed: Jun. 14, 1988

[30] Foreign Application Priority Data

Jun. 15, 1987 [FR] France ................. 87 08286

[51] Int. Cl.$^4$ ............................................. H04J 3/26
[52] U.S. Cl. ...................................... 370/94; 370/105
[58] Field of Search .................. 370/94, 60, 68, 104, 370/112

[56] References Cited

U.S. PATENT DOCUMENTS

| | | | |
|---|---|---|---|
| 4,612,636 | 9/1986 | Grover et al. | 370/94 |
| 4,712,063 | 1/1987 | Warner | 370/68 |
| 4,713,804 | 12/1987 | Servel et al. | 370/68 |
| 4,719,624 | 1/1988 | Bellisig | 370/100 |

Primary Examiner—Douglas W. Olms
Assistant Examiner—Min Jung
Attorney, Agent, or Firm—Lowe, Price, LeBlanc, Becker & Shur

[57] ABSTRACT

The apparatus is designed to use a single transmission medium to multiplex frames consisting of any number of bits of different origins which have previously passed through an asynchronous time-division network and are delivered in the form of packets of fixed length interlaced by an asynchronous time-division multiplex. A detection and write management circuit receives the packets and writes them in a packet memory as and when they arrive. In parallel with the writing of the packets, the addresses of the memory cell having memorized the packets of a given frame are written in the form of a string of frame addresses in a second memory. After complete writing of a frame in the first memory, a frame read and transmission circuit completely reads the frame using the corresponding address string and transmits it in serial form on the transmission medium. Packing words such as flags are inserted between the frames read.

21 Claims, 8 Drawing Sheets

APPARATUS FOR RECONSTRUCTING AND MULTIPLEXING FRAMES OF VARIOUS ORIGINS MADE UP OF A VARIABLE NUMBER OF PACKETS OF FIXED LENGTH

BACKGROUND OF THE INVENTION

This invention relates to an apparatus which receives packets belonging to different frames of various origins, carried in interlaced form by an incoming asynchronous time-division multiplex, groups the packets of each frame together and retransmits the reconstructed frames in serial form over a single outgoing transmission medium.

The packets are all of the same length and are carried in the incoming asynchronous time-division multiplex. A frame consists of packets concerning a given communication link, of any length defined as a number of bits. The packets of a given link are identified by a label which is included in the packet header. The first and last packets of an incoming frame comprise an open-frame and end-frame flag respectively. The frame format can comply with the HDLC standard. Transmission of a frame over the outgoing transmission medium consists in serial transmission of all the bits of the frame, in the same order as their order of arrival in the apparatus. Aligned flags are inserted between the reconstructed frames.

The problem of reconstructing frames such as this was raised in the study project called PRELUDE, conducted by the French Post and Telecom authorities in connection with a wideband asynchronous time-division digital network (RTA). In particular, it is necessary to reconstruct frames in the local switching exchanges of the RTA network and in bridges between the RTA network and synchronous packet transmission networks, such as TRANSPAC.

For example, an apparatus according to the invention, included in an asynchronous local time-division switching exchange would recompose the signalling frames from the incoming signalling packets in order to transmit the reconstructed frames to a signalling node ensuring their processing. In an asynchronous time-division exchange, all the incoming signalling packets converge on one or more signalling queues. The apparatus is connected to the input of a signalling queue and receives the incoming signalling packets delivered by the queue.

In addition, an asynchronous time-division network must, at least during the installation transition phase, live side by side with existing synchronous packet transmission networks such as TRANSPAC. In other words, it must be possible to establish data links between terminals connected to the asynchronous time-division network and terminals connected to Transpac type networks. Passage from one network to another is by bridges. In the direction of transmission from asynchronous time-division network to Transpac type network, the function of the apparatus according to the invention is to reconstruct the frames from the packets delivered by the asynchronous time-division network, before they are processed by a bridge.

OBJECT OF THE INVENTION

The object of the invention is therefore to provide an apparatus which receives incoming asynchronous packets, belonging to interlaced frames of different lengths, and reconstruct multiplexed frames of packets.

SUMMARY OF THE INVENTION

An apparatus according to the invention comprises:

a first memory having a determined number of first locations for momentarily memorizing said incoming packets of said interlaced frames, means for establishing first addresses of said first locations, a second memory having a number of second locations at least equal to said first location number for memorizing said first addresses of the first locations having memorized incoming packets, writing means detecting said incoming packets belonging to said interlaced frame for writing each detected incoming packet in one first location and writing the first address of said first location in one second location, said second location having a second address equal to the first address of another first location having memorized another detected incoming packet belonging to the same frame and preceding said detected incoming packet in said frame, and reading means receiving the first address of the first location having memorized a first detected incoming packet of a frame fully written in said first memory for successively reading said addresses written in said second locations corresponding to said first locations memorizing said packets of said frame starting from the second location with second address equal to said first address of said first location having memorized a second detected incoming packet of said frame, and reading said packets in said first locations for serial transmission of each bit of said frame read in said first locations in chronological order of writing of said packets of said frame.

In a preferred embodiment, wherein said incoming packets comprise a predetermined number of words, said incoming packets comprise first words constituting labels identifying the frame to which said packets belong, second words in said first incoming packets belonging to said interlaced frames are identical to a predetermined beginning of frame pattern, and last incoming packets belonging to said interlaced frames each contains a predetermined end of frame pattern, said writing means comprises:

first means for detecting said labels in said incoming packets, a second means for detecting said beginning and end patterns in said incoming packet, and a number of memory control cells allocated respectively to said interlaced frames and receiving said first addresses, the cell allocated to a frame being write addressed in response to the label detected in said incoming packets of said frame, and memorizing a first address of a first location in said first memory in which the first packet of said frame is memorized in response to said beginning pattern detected in said first packet, and another first address of another first location in said first memory in which an incoming packet of said frame is written in response to the label detected in said incoming packet, said another first address being read in said cell to act as a write addressing second address of said second memory in response to the next detected incoming packet of said frame, said first address of said first location memorizing said first frame packet being read in said cell and being transmitted with said frame label to said reading means in response to said end pattern detected in said last packet of said frame.

According to another feature of the invention, said reading means comprises:

means for memorizing said first addresses of said first locations of said first memory having memorized said first packets of completely written frames, read addressing means for successively reading said addresses written in said second locations of said second memory corresponding to said first locations of said first memory having memorized said packets of said completely written frame, starting from said second location having memorized said first address of said first location having memorized said second packet of said frame, in order to read said packets of said frame in said first memory successively by means of said first address of said first packet of said frame memorized in said memorizing means and by means of said addresses read consecutively in said second memory, and means for serializing and transmitting said frames from said packets read in said first memory by inserting predetermined packing words between said frames transmitted.

BRIEF DESCRIPTION OF THE DRAWING

The foregoing and other objects, features and advantages of the invention will be apparent from the following detailed description of several preferred embodiments of the invention with reference to the corresponding accompanying drawings in which:

As shown in FIG. 1, frame reconstruction and multiplexing apparatus according to the invention comprises a packet detection and write management circuit 1, a buffer circuit for storing packet strings 2, a frame reading and transmission circuit 3, a memorization and memory address management circuit 4, and a control signal generation and sequencing circuit 5.

Circuit 1 receives packets PQ through eight parallel packet byte inputs 101. The term "packet" is used here in its most general sense and not in the sense attributed to it by the X25 transmission standard. The packets PQ are each made up of L=16 bytes, B0 to B15, time-division multiplexed in a packet buss BP connected to inputs 101. The eight bits of a packet byte are transmitted in parallel on the BP bus. The BP bus is a data transmission bus for an asynchronous time-division packet multiplex MP, output for example by an asynchronous time-division packet switching device in an asynchronous time-division network. Inputs 102, 103 and 104 respectively receive signalling signals DP, PP and a byte clock signal HO. Inputs 101 to 104 constitute an input gate to the apparatus connected to the multiplex MP. The signal DP indicates the beginning of transmission of a packet PQ, and is at logic state "1" during reception of the first byte B0 of this packet. The signal PP indicates the presence of a packet PQ in the bus BP. The signal PP is at state "1" during transmission of the L=16 bytes, B0 to B15, of a packet PQ. The first byte B0 of a packet PQ constitutes a label ET identifying a communication link. The packets concerning a given communication link have identical labels and constitute a series of variable length frames. A number of packet frames TR corresponding to a number of communication links respectively are transmitted on the bus BP. The various frames TR are interlaced. Packet transmission in the multiplex MP is asynchronous and the packets making up a given frame are received at inputs 101 at indeterminated moments.

Figure 2:
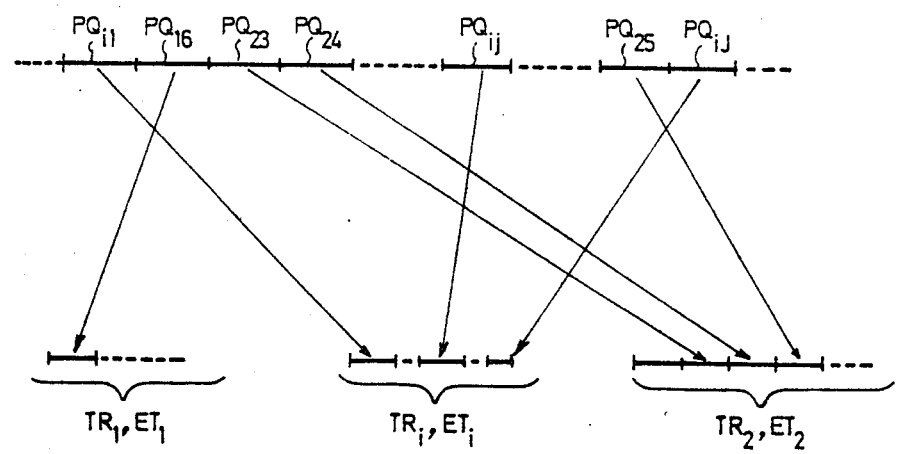
FIG. 2 shows the reconstruction of frames from corresponding interlaced packets entering the apparatus.

FIG. 2 shows a frame $TR_i$ comprising J packets $PQ_{i1}$, ... $PQ_{ij}$, ... $PQ_{iJ}$, where i is an integer index designating the frame, J is an integer of variable value representing a frame length, and j is an integer index between 1 and J. Packets $PQ_{i1}$ to $PQ_{iJ}$ have the same $ET_i$ label. Between reception of the various packets $PQ_{i1}$ to $PQ_{iJ}$ of frame $TR_i$, other packets $PQ_{16}$, $PQ_{23}$, $PQ_{25}$ of frames $TR_1$, $TR_2$ being received, are also received at inputs 101.

Figure 3:
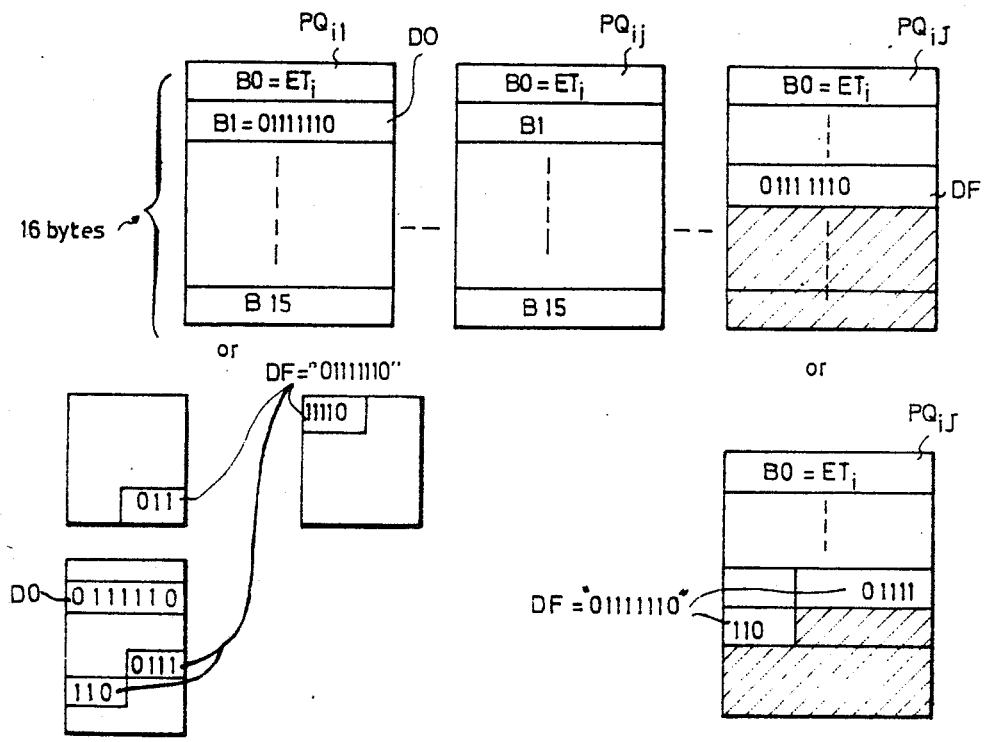
FIG. 3 shows the structure of packets in the frames.

As shown in FIG. 3, the first packet $PQ_{i1}$ of frame $TR_i$ comprises an end of frame flag DF which can be a byte of any rank in packet $PQ_{ij}$ other than the byte B0 constituting the label $ET_i$, or more generally be contained in two consecutive bytes other than the byte B0 or be contained in two consecutive packets with the same label, or finally be contained in the same packet as the packet containing the beginning of frame packet DO. The bits and bytes of packet $PQ_{iJ}$ following reception of the end of frame flag DF can be made up of the same binary combination, equal to "01111110" in the case for example of the HDLC data transmission protocol.

Circuit 1 detects the beginning and end of frame flags B0 and DF, as well as the labels $ET_i$, in order to manage writing in buffer circuit 2 of each packet $PQ_{ij}$ received by the apparatus.

For each packet being received, the memorization and memory address management circuit 4 sends to circuit 1 the address of a memory location available buffer circuit 2, where the packet being received can be written. As soon as reception of a packet $PQ_{ij}$ begins at inputs 101 of circuit 1, an address $AP_{ij}$ is sent to parallel inputs 105 of circuit 1 by parallel output 401 of the memorization and memory address management circuit 4. The address $AP_{ij}$ which is supplied by circuit 4 is the address of available packet memory location in a packet memory 21 of buffer circuit 2. The address $AP_{ij}$ is delivered by circuit 4 under the control of the beginning of packet signal DP applied to input 402 of circuit 4. An acknowledgment of receipt signal RAP is transmitted by an output 106 of circuit 1 to an input 403 of circuit 4, after recognition of the address $AP_{ij}$ by circuit 1. The packet $PQ_{ij}$ of frame $TR_i$ is written in the memory location with address $AP_{ij}$ in memory 21. The packet $PQ_{ij}$ is supplied by parallel outputs 107 of circuit 1 to parallel data inputs 211 in the packet memory 21. The outputs 107 deliver the packet $PQ_{ij}$ byte by byte at the rate of the HO clock signal.

Memory 21 comprises N packet memory locations, where N is an integer determined according to a packet rate in the BP bus and a means statistical number of packets in a frame. Each of the packet memory locations is divided into $L-1=15$ byte memory locations, the $ET_i$ label of a packet $PQ_{ij}$ not being written in memory 21. Thus the packet memory location of address $AP_{ij}$ is divided into $L-1=15$ byte memory locations with addresses $AP_{ij}+1$, $AP_{ij}+2$, ... $AP_{ij}+15$ respectively, in which bytes B1, B2 ... B15 respectively of packet $PQ_{ij}$ are written; the location with address $AP_{ij}+1$ contains the beginning of frame flag DO if $AP_{ij}=AP_{i1}$.

The address $AP_{ij}$, provided by circuit 4, of the location in which a packet $PQ_{ij}$ is written in memory 21, is delivered to memory 21 via the parallel address outputs 108 of circuit 1. Increments $+1, +2, \ldots, +15$ are supplied by other parallel address outputs 109 of circuit 1 at the rate of signal HO. The parallel outputs 108 and 109 are connected wire by wire to parallel write address inputs 212 in memory 21 respectively, such that the $L-1=15$ addresses $AP_{ij}+1$ to $AP_{ij}+15$ are applied to the address inputs 212 in parallel with the $L-1=15$ bytes B1 to B15 of packet $PQ_{ij}$ supplied at the data inputs 211. Address $AP_{ij}$ is also supplied by address outputs 108 of circuit 1 to parallel data inputs 221 of a packet frame address string memory 22 included in buffer circuit 2.

The function of memory 22 is to memorize the addresses $AP_{ij}$ of packets $PQ_{ij}$ as and when they are written in the packet memory 21. When a complete packet frame $TR_i$ has been written in packet memory 21, addresses $AP_{i1}$ to $AP_{iJ}$ of packets $PQ_{i1}$ to $PQ_{iJ}$ respectively are memorized in memory 22. Addresses $AP_{i1}$ to $AP_{iJ}$ are memorized in the form of an address string so that the frame reading and transmission circuit 3 can access in memory 21 all the packets of frame $TR_i$ while at the outset only knowing the address $AP_{i1}$ of the first packet $PQ_{i1}$ of frame $TR_i$. Memory 22 comprises N distinct address word memory locations, each of which memorizes an address $AP_{ij}$ and is respectively allocated to N packet memory locations. The N address memory locations are addressed by circuit 1 via parallel address outputs 101a connected wire to wire to parallel write address inputs 222 in memory 22. When a packet $PQ_{ij}$ is being written in memory 21, the address $AP_{ij}$ is supplied to the data inputs 221 in memory 22. This address $AP_{ij}$ is written in a location of memory 22 having an address $AP_{i,j-l}$. The address $AP_{i,j-l}$ is that in memory 21 of packet $PQ_{i,j-l}$ received in circuit 1 prior to packet $PQ_{ij}$ currently being received. Address $AP_{i,j-l}$ is contained in a memory cell, addressed by label $ET_i$, in a control memory in circuit 1. It is delivered via outputs 101a to the write address inputs 222 of memory 22. When a complete frame $TR_i$ is contained in packet memory 21, memory 22 memorizes the address $AP_{i2}$ in the memory location of address $AP_{i1}$, ... address $AP_{ij}$ in the memory location of address $AP_{i,j-l}$, ... address $AP_{iJ}$ in the memory location of address $AP_{i,J-l}$. Circuit 3, to which circuit 1 supplies the address $AP_{i1}$ of the first packet $PQ_{ij}$ of frame $TR_i$, accesses addresses $AP_{i1}$ to $AP_{iJ}$ of packets $PQ_{i1}$ to $PQ_{iJ}$ memorized in memory 21, by consecutive read operations in memory 22.

The address $AP_{i1}$ of the first packet $PQ_{i1}$ of frame $TR_i$ is delivered by parallel outputs 102a of circuit 1 to parallel inputs 301 of circuit 3, when an end flag DF is detected on frame $TR_i$ and an end flag detection signal DDF at state "1" is supplied by an output 103a of circuit 1 to a write control input 302 of circuit 3. In parallel with address $AP_{i1}$, the label $ET_i$ is delivered by parallel outputs 104a of circuit 1 to parallel inputs 303 of circuit 3.

The control signal generation and sequencing circuit 5 is a conventional logic circuit whose function is to generate various signals SC1 to SC10, required for controlling and sequencing operations, mainly write and read, performed in circuits 1 and 3, as well as in buffer circuit 2.

Circuit 5 receives signals HO, PP, DP, a frame reception signalling bit $BRT_i$ and an open frame flag detection signal DDO at inputs 50, 51, 52, 53 and 54 respectively. These signals are used to produce signals SC1 to SC10. The bit $BRT_i$ and the signal DDO are supplied by outputs 105a and 106a of circuit 1 respectively. Circuit 1 receives the control and sequencing signals SC1 to SC7. The signal SC1 is also delivered to a write/read selection input 213 of packet memory 21. Signal SC8 is delivered to a write/read selection input 223 of address string memory 22. Circuit 3 receives signals SC9 and SC10.

The frame reading and transmission circuit 3 is responsible for reading the complete packet frames memorized in buffer circuit 2 in order to transmit them over a frame transmission medium MT to a TRANSPAC type network for example.

The byte transmission clock signal HO and a bit transmission clock signal HB, both output by the multiplex MP, are supplied to inputs 304 and 305 of circuit 3 respectively. The signal HB has a frequency equal to eight times that of the signal HO. An internal FIFO (first in, first out) type address register in circuit 3 memorizes the addresses $AP_{i1}$ of the first packets $PQ_{i1}$ of the $TR_i$ frames received, that is the frames whose end flag DF has been detected. These frames are memorized in buffer circuit 2. Circuit 3 reads in turn all packets $PQ_{i1}$ to $PQ_{iJ}$ of a frame and transmits them as and when they are read, bit by bit, via an output 306, over medium MT in parallel form by parallel outputs 308 of circuit 3. Outputs 306 to 308 constitute an output port in circuit 3, connected to medium MT.

A location of memory 22 containing an address $AP_{ij}$ is addressed by circuit 3 via parallel address outputs 309 connected to parallel read address inputs 224 of address string memory 22. The address $AP_{ij}$ contained in the memory location addressed is delivered by parallel data outputs 225 of memory 22 to parallel address inputs 301a of circuit 3. A location of memory 21 containing a packet $PQ_{ij}$ is addressed byte by byte at the rate of the signal HO by circuit 3 via other parallel address outputs 302a connected to parallel read address inputs 214 of packet memory 21. The packet $PQ_{ij}$ contained in the addressed memory location is delivered byte by byte by parallel data outputs 215 of packet memory 21 to eight parallel frame inputs 303a in circuit 3.

To read a frame $TR_i$ memorized in memory 21, circuit 3 first of all addresses memories 22 and 21 by applying addresses $AP_{i1}$ and $AP_{i1+2}$ to $AP_{i1+15}$, supplied via outputs 309 and 302a, to inputs 224 and 214 respectively. In response to address $AP_{i1}$ applied to inputs 224, memory 22 supplies circuit 3, via data outputs 225, with address $AP_{i2}$, which will be used subsequently to read the second packet $PQ_{i2}$ of frame $TR_i$ in memory 2. In response to addresses $AP_{i1+2}$ to $AP_{i1+15}$ applied to inputs 214 consecutively, memory 21 supplies circuit 3, via outputs 215, with the L−2=14 bytes B2 to B15 of packet $PQ_{i1}$ following the open flag DO memorized in memory 21 at address $AP_{i1+1}$. In general, all the flags DO and DF are memorized in memory 21, but only the end flags DF are read by circuit 3, so that it can detect the end of a packet frame being transmitted over medium MT. To read packet $PQ_{i2}$, circuit 3 then provides memories 22 and 21 with addresses $AP_{i2}$ and $AP_{i2+1}$ to $AP_{i2+15}$ respectively, in order to read the $AP_{i3}$ address to be used for reading the next packet $PQ_{i3}$ of frame $TR_i$ and the L−1=15 data or signalling bytes B1 to B15 of packet $PQ_{i2}$. Circuit 3 reads each of packets $PQ_{i3}$ to $PQ_{iJ}$ according to a read cycle similar to that of packet $PQ_{i2}$. Packet $PQ_{iJ}$ which contains the closure flag DF, is recognized by circuit 3 as being the last packet of frame $TR_i$. Circuit 3 then begins reading in buffer circuit 2 and transmission over medium MT of another packet frame $TR_{i+1}$ whose first packet address $AP_{i+1,1}$ is memorized in the FIFO address register in circuit 3, after address $AP_{i1}$.

Circuit 3 is connected to the memorization and memory address management circuit 4. Parallel outputs 304a and output 305a of circuit 3 are connected to parallel inputs 404 and an input 405 of circuit 4 respectively.

On reading a packet $PQ_{ij}$ in buffer circuit 2, circuit 3 supplies the address $AP_{ij}$ where packet $PQ_{ij}$ has just been read in memory 21 to inputs 404 of circuit 4, via outputs 304a. After reading packet $PQ_{ij}$ in memory 21 and transmitting over medium MT, the packet and address word locations of address $AP_{ij}$ in memories 21 and 22 become available for further use by circuit 2 for new incoming packets. Address $AP_{ij}$ is written in a FIFO register in circuit 4 under the control of an write control signal EAP at state "1", supplied by output 305a of circuit 3 to input 405 of circuit 4. This address $AP_{ij}$ is queued before being delivered to inputs 105 of circuit 1, via outputs 401 of circuit 4.

Figure 4:
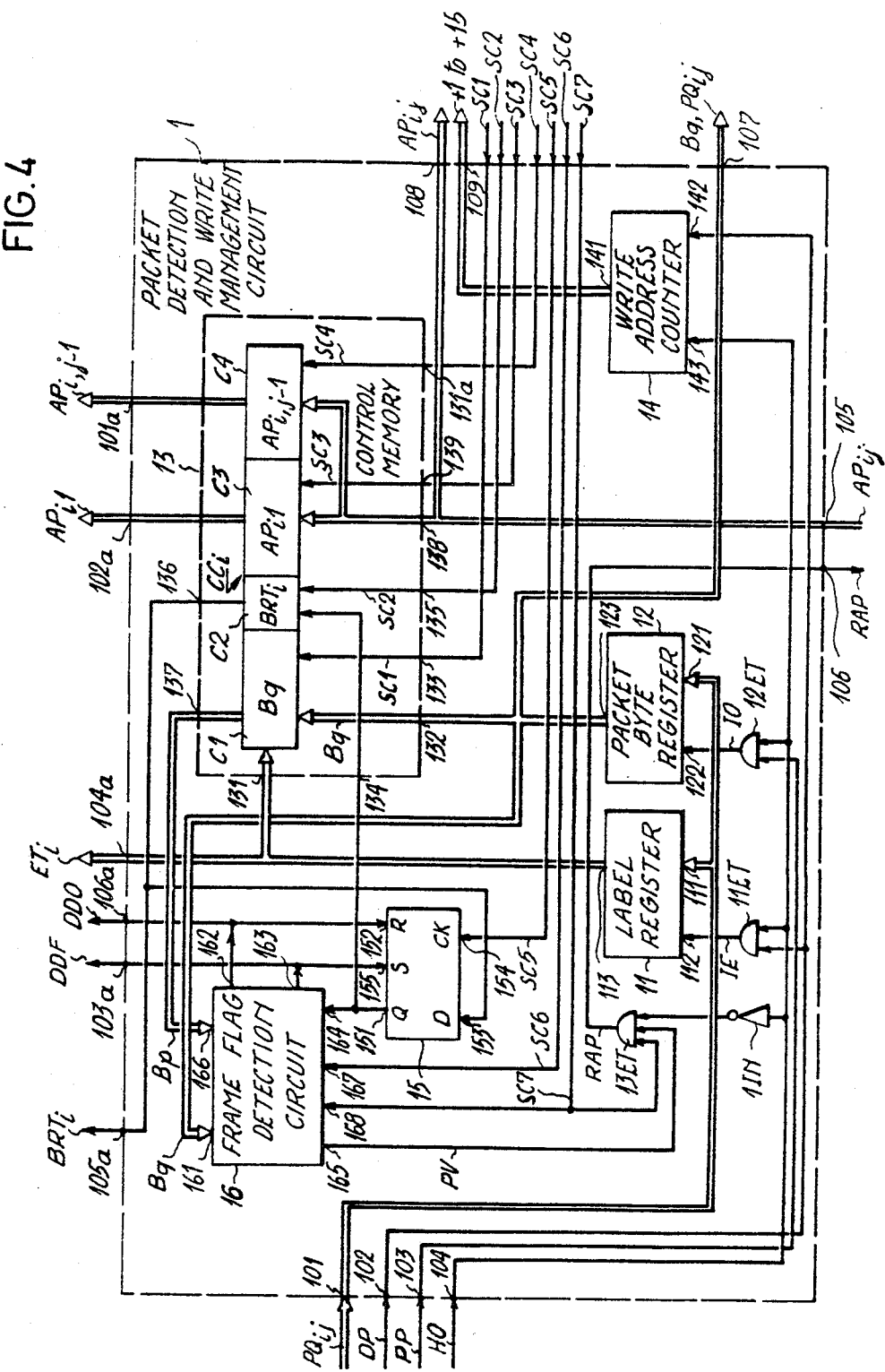
FIG. 4 is a detailed block diagram of a packet detection and write management circuit in the apparatus.

With reference to FIG. 4, the packet detection and write management circuit 1 essentially comprises a label register 11, a packet byte register 12, a control memory 13, a write address counter 14, a frame reception bit flip-flop 15 and a frame flag detection circuit 16.

Registers 11 and 12 are eight-bit buffer-registers. They both receive at parallel data inputs 111 and 121 respectively, and byte by byte, bytes B0 to B15 of incoming packets $PQ_{ij}$ output by bus BP and present at parallel inputs 101 of circuit 1 in turn. Register 11 memorizes label $ET_i$ of a packet $PQ_{ij}$ when a label load pulse IE at state "1" is applied to load control inputs 112 of register 11 supplied by a two-input AND gate 11ET. The inputs of the gate 11ET are respectively connected to inputs 102 and 104 of circuit 1 and receive the signals DP and HO. Register 12 memorizes the incoming byte of packet $PQ_{ij}$ being received when a byte load pulse IO at state "1" supplied by an output of a two-input AND gate 12ET receive the signal PP and the signal HO respectively, via inputs 103 and 104 of circuit 1.

Figure 5:
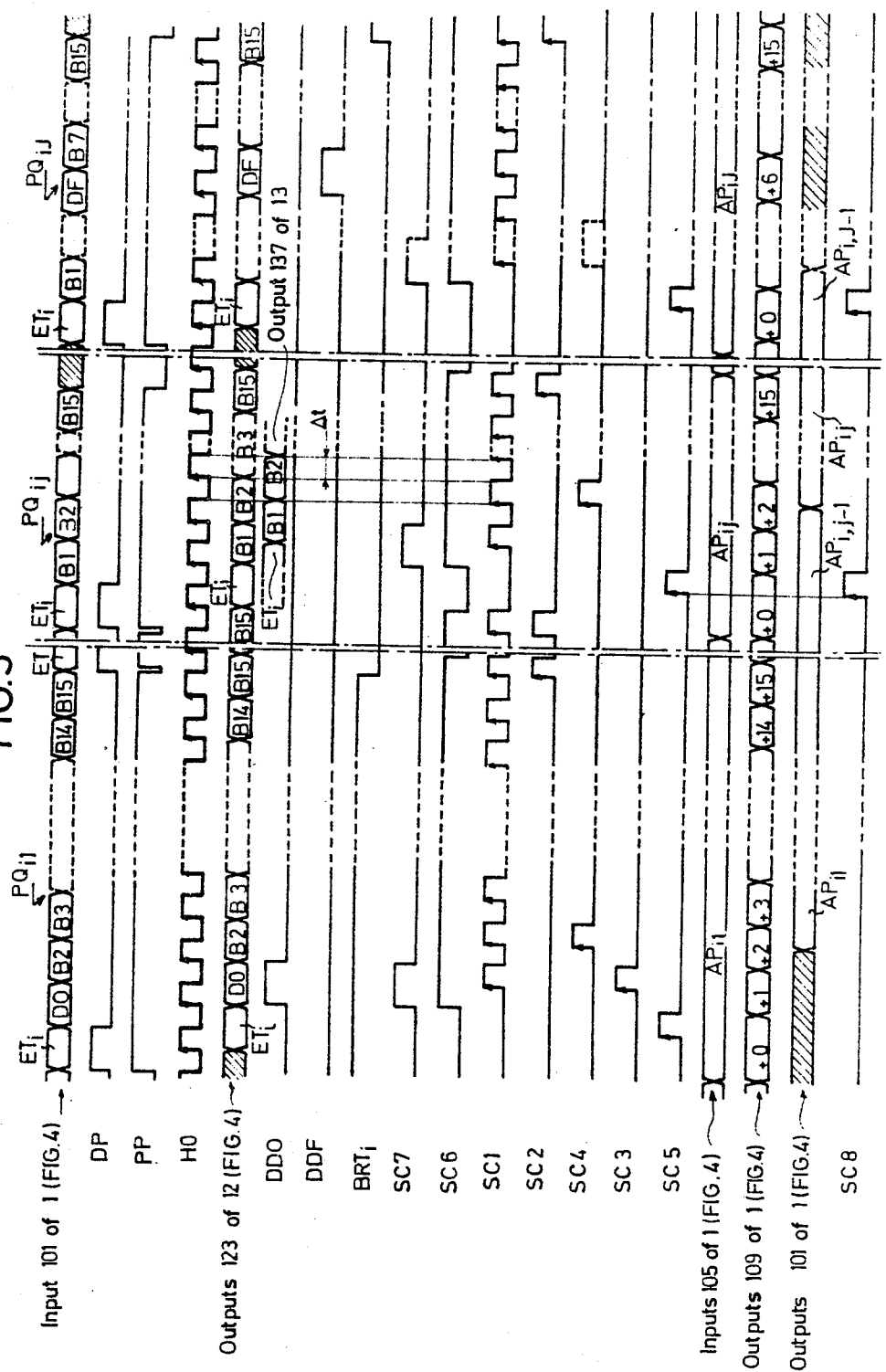
FIG. 5 is a time chart concerning the operation of the circuit shown in FIG. 4.

The waveforms of the signals DP, PP and HO are shown as an example at the top of FIG. 5 for incoming packets $PQ_{i1}$, $PQ_{ij}$ and $PQ_{iJ}$ for the same packet frame $TR_i$. The bytes of packets $PQ_{i1}$, $PQ_{ij}$ and $PQ_{iJ}$ are numbered B0 to B15, in chronological order of arrival at inputs 101 of circuit 1. Byte B0 of each of packets $PQ_{i1}$, $PQ_{ij}$ and $PQ_{iJ}$ is an $ET_i$ label. Byte B1 of packet $PQ_{i1}$ is an open flag DO, byte B6 of packet $PQ_{iJ}$ is an end flag DF.

The fifth line of FIG. 5 shows bytes B0 to B15 of each of packets $PQ_{i1}$, $PQ_{ij}$ and $PQ_{iJ}$ delivered by the parallel outputs 123 of register 12 at each rising edge of the clock signal HO. The label $ET_i$ is loaded in parallel in both registers 11 and 12. It remains present at parallel outputs 113 of register 11, connected to outputs 104a of circuit 1, throughout the duration of reception of a packet and until the signal DP indicates the beginning of the next packet and orders loading of its label in registers 11 and 12.

The label $ET_i$ present at outputs 113 of label register 11 is applied to address inputs 131 of control memory 13 and selects a control cell $CC_i$ from this memory 13, attributed to frame $TR_i$ with label $ET_i$, currently being received. Control memory 13 comprises as many control cells as there are possible binary combinations for a lable $ET_i$, that is $2^8 = 256$ if the label is encoded over light bits. A control cell $CC_i$ addressed by the corresponding label $ET_i$ is associated with each frame $TR_i$ being received.

A cell $CC_i$ comprises four memory locations C1 to C4 individually loaded when ordered by signals SC1 to SC4 respectively. Location C1 memorizes an incoming byte Bq, where q is an integer between 1 and 15. It is loaded consecutively with bytes B1 to B15 delivered by outputs 123 of register 12 to parallel data inputs 132 of memory 13.

A byte Bq is loaded into location C1 on a rising edge of control signal SC1. Signal SC1 is represented on the eleventh line of FIG. 5. The signal SC1 produced by circuit 5 (FIG. 1) is applied to an input 133 of memory 13. The rising edges of signal SC1 correspond to falling edges of the clock rate signal HO. Only the label $ET_i$ for a packet $PQ_{ij}$ being received is not loaded into location C1, the other bytes received B1 to B15 are loaded when ordered by the corresponding rising edges of signal SC1. At the same time as its loading into cell $CC_i$, an incoming byte Bq of a packet $PQ_{ij}$ is written in packet memory 21 (FIG. 1) also under the control of signal SC1. Bytes B1 to B15 are supplied to memory 21 via outputs 107 of circuit 1 connected to outputs 123 of register 12.

Via parallel outputs 141 connected to outputs 109 of circuit 1, write address counter 14 supplies address increments +1 to +15 added to the packet address $AP_{ij}$, to address, byte by byte, the memory location with address $AP_{ij}$, intended to store bytes B1 to B15 of packet $PQ_{ij}$. The address increments supplied by counter 14 are on the third line from the bottom in FIG. 5.

Counter 14 is a modulo 16 binary counter; binary combination 0 corresponding to increment +0 is not used. Inputs 142 and 143 of counter 14 are connected to inputs 102 and 104 of circuit 1 respectively and receive signals DP and HO. Input 142 is a reset input and input 143 is a counting clock input. The address increments supplied by outputs 141 switch on rising edges of the signal HO such that they are stabilized when the rising edges of the signal SC1 occur to control writing of bytes B1 to B14 in memory 21.

Location C2 of cell $CC_i$ contains the frame reception bit $BRT_i$ for the frame $TR_i$ currently being received. The bit $BRT_i$ is written at either "1" or "0" supplied to an input 134 of memory 13 by an output 151 of flip-flop 15. The bit $BRT_i$ is shown on the eighth line of FIG. 5. The bit $BRT_i$ is written, at the state "0" or "1" delivered to input 134, under the control of signal SC2 applied to an input 135 of memory 13, in parallel with loading of byte B15 in location C1 or in memory 21. The signal SC2 is shown on the twelfth line of FIG. 5. The bit BRT$_i$ at state "0" indicates that a frame TR$_i$ is being received, that is, an open flag DO has been detected. The open flag detection signal DDO is shown on the sixth line of FIG. 5.

The signal DDO is at state "1" when the flag DO of packet PQ$_{i1}$ is detected at parallel inputs 161 of the frame flag detection circuit 16. The signal DDO is supplied by an output 162 of circuit 16 to a reset input 152 (R) of flip-flop 15. When the flag DO of packet PQ$_{i1}$ is detected, output 151 (Q) of flip-flop 15, initially at "1", is written under the control of signal SC2 at state "0" delivered by flip-flop 15. The signal BRT$_i$ is supplied by an output 136 of memory 13 to a data input 153 (D) of flip-flop 15. A clock input 154 (CK) of flip-flop 15 receives the control signal SC5. Signal SC5 is shown in FIG. 5 on the fifth line from the bottom. The state of the bit BRT$_i$ is loaded into flip-flop 15 at the beginning of each packet, in response to a rising edge of a pulse of the signal SC5. This pulse is synchronous with the falling edge of a pulse of the signal HO controlling loading of the label ET$_i$ into register 11.

When an end flag DF is detected by circuit 16 in packet PQ$_{ij}$, an output 163 of circuit 16 delivers the end of frame detection signal DDF at state "1". The signal DDF, which is not synchronous with the byte rate, is shown on the seventh line of FIG. 5. The signal DDF is supplied to a set input 155 (S) of flip-flop 15. Output 151 (Q) of the flip-flop 15 initialized at the beginning of the packet to state "0" is then forced to state "1". This state "1" is then written in location C2 at the end of reception of packet PQ$_{ij}$, under the control of signal SC2. For any packet with a label ET$_i$ received in circuit 1, the state of the bit BRT$_i$ indicates whether a frame TR$_i$ is being received or not.

The function of the flags detection circuit 16 is to detect a flag DO or DF in a packet being received. It also indicates whether a packet received is valid or not.

Circuit 16 has an input 164 connected to output 151 (Q) of flip-flop 15. At the beginning of packet reception, when the signal SC5 goes to state "1", this input 164 receives the state of bit BRT$_i$ contained in location C2 of addressed cell CC$_i$. An output 165 of circuit 16 delivers a PV signal at state "1" when a received packet PQ$_i$ with label ET$_i$ is valid, and at state "0" when the received packet PQ$_i$ is invalid.

To decide whether a packet PQ$_i$ is valid or not, circuit 16 analyzes the state of the bit BRT$_i$ supplied to input 164. If the bit BRT$_i$ is at "1" and an open flag DO is detected by circuit 16, the packet PQ$_i$ is declared valid, PV = "1"; packet PQ$_i$ is the first packet PQ$_{i1}$ of a frame TR$_i$. If the bit BRT$_i$ is at "1" and no open flag DO is detected by circuit 16, the packet PQ$_i$ is declared invalid, PV = "0".

Circuit 16 comprises parallel inputs 166 connected to parallel outputs 137 of control memory 14. The outputs 137 supply the packet byte bq loaded into location C1. Control signals SC6 and SC7 are applied to inputs 167 and 168 of circuit 16 respectively. These signals are shown on the tenth and ninth lines of FIG. 5. Signals SC6 at "1" signifies the presence of a byte B1 at inputs 161. For a packet PQ$_{i1}$ being received, signals SC6 and SC7 indicate respectively bytes B1 to B15 possibly containing an end flag DF and byte B1 possibly containing an open flag DO.

To detect an open flag DO"01111110" in a packet PQ$_{i1}$, circuit 16 performs a logic function expressed by the following logic equation:

$$DDO = SC7 \cdot BRT_i \cdot \overline{bq_0} \cdot bq_1 \cdot bq_2 \cdot bq_3 \cdot bq_4 \cdot bq_5 \cdot bq_6 \cdot \overline{bq_7}$$

where $bq_0$ to $bq_7$ represent the bits of byte Bq, from LSB to MSB, being received at inputs 161 of circuit 16. The signal SC7 only authorizes acceptance of byte B1. The bit BRT$_i$ at state "1" is a necessary precondition for a packet PQ$_{ij}$ being received to be the first packet PQ$_{i1}$ of frame TR$_i$, the bit BRT$_i$ only changing state after acceptance of the last byte B15 of a packet.

Figures 6, 7:
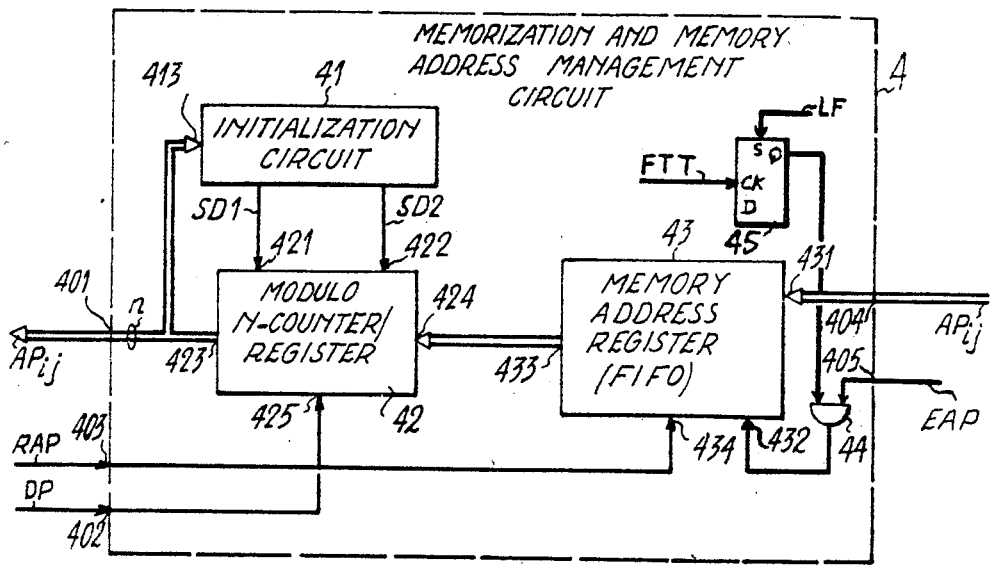
FIG. 6 shows various possibilities for transmission of an end of frame flag contained in two consecutive bytes of a given packet.
FIG. 7 is a block diagram of a memorization and memory address management circuit in the apparatus.

Detection of flag DF = "01111110" in a packet PQ$_{ij}$ is more complex, given that a flag DF can be contained in two consecutive bytes of the PQ$_{ij}$ packet, or two bytes of two consecutive packets of the frame TR$_i$, or even one of the other situations mentioned regarding FIG. 3. The various situations which could occur are shown in FIG. 6 for two consecutive bytes Bp and Bq of a packet PQ$_{ij}$, where p and q are consecutive integers between 1 and 15 inclusive.

Signal SC6 and the bit BRT$_i$ at "1" and "0" respectively, are two necessary preconditions for detection of a flag DF in a packet being received. The logical function performed by circuit 16 to detect a flag DF = "01111110" is expressed by the following logic equation:

$$\begin{aligned}DDF = SC6 \cdot \overline{BRT_i} \cdot [&bp_1 \cdot bp_2 \cdot bp_3 \cdot bp_4 \cdot bp_5 \cdot bp_6 \cdot bp_7 \cdot \overline{bp_0} + \\ &bp_2 \cdot bp_3 \cdot bp_4 \cdot bp_5 \cdot bp_6 \cdot bp_7 \cdot \overline{bq_0} \cdot bq_1 + \\ &bp_3 \cdot bp_4 \cdot bp_5 \cdot bp_6 \cdot bp_7 \cdot \overline{bq_0} \cdot bq_1 \cdot bq_2 + \\ &bp_4 \cdot bp_5 \cdot bp_6 \cdot bp_7 \cdot \overline{bq_0} \cdot bq_1 \cdot bq_2 \cdot bq_3 + \\ &bp_5 \cdot bp_6 \cdot bp_7 \cdot \overline{bq_0} \cdot bq_1 \cdot bq_2 \cdot bq_3 \cdot bq_4 + \\ &bp_6 \cdot bp_7 \cdot \overline{bq_0} \cdot bq_1 \cdot bq_2 \cdot bq_3 \cdot bq_4 \cdot bq_5 + \\ &bp_7 \cdot \overline{bq_0} \cdot bq_1 \cdot bq_2 \cdot bq_3 \cdot bq_4 \cdot bq_5 \cdot bq_6 + \\ &\overline{bq_0} \cdot bq_1 \cdot bq_2 \cdot bq_3 \cdot bq_4 \cdot bq_5 \cdot bq_6 \cdot \overline{bq_7}]\end{aligned}$$

where $\overline{bp_0}$ to $\overline{bp_7}$ and $\overline{bq_0}$ to $\overline{bq_7}$ correspond to the eight bits of bytes Bp and Bq respectively, from the LSB to the MSB.

Detection of end flag DF implies availability of both the byte being received Bq and the previous byte Bp. Byte Bp should therefore be memorized at reception until the arrival of byte Bq, so that both bytes Bp and Bq are available in circuit 1 for a given time interval Δt. Memory location C1 in a control cell CC$_i$ performs this memorization of the previous byte Bp. A time interval Δt, during which the two consecutive bytes B2 and B3 of a packet PQ$_{ij}$ are present at inputs 166 and 161 respectively, is shown at the top of FIG. 5. The bytes delivered by outputs 123 of register 12 are shown in the fifth line of FIG. 5; those delivered by outputs 137 of memory 13 are shown between the fifth and the sixth lines of FIG. 5.

Addresses AP$_{ij}$ present at inputs 105 of circuit 1 are supplied directly to outputs 108 of circuit 1 to the data inputs 221 of the packet frame address string memory 22 (FIG. 1) and to parallel inputs 138 of control memory 13. When an address AP$_{ij}$ is the address AP$_{i1}$ of a first frame packet PQ$_{i1}$, this address AP$_{ij}$ = AP$_{i1}$ is loaded into memory location C3 of cell CC$_i$ under the control of signal SC3 which is shown on the sixth line from the bottom of FIG. 5. Signal SC3 only delivers a pulse at "1" if an open flag DO is detected, and therefore only for the first packet PQ$_{i1}$ of a frame TR$_i$. The address AP$_{i1}$ loaded into the memory location C3 is supplied to outputs 102a of circuit 1 towards inputs 301 of circuit 3 (FIG. 1).

Address $AP_{i1}$ is also loaded into memory location C4 of cell $CC_i$, as are all the following consecutive addresses $AP_{i2}, AP_{i3}, \ldots AP_{iJ}$. Loading of addresses $AP_{i1}$ to $AP_{iJ}$ in memory location C4 is controlled by the signal SC4 supplied to an input 131a of control memory 13. Signal SC4 is shown on the seventh line from the bottom of FIG. 5. An address $AP_{ij}$ is loaded into memory location C4 on a rising edge of a pulse of the signal SC4 at "1". This pulse occurs at the same time as loading of byte B2 of the packet $PQ_{ij}$ being received in packet memory 21. An address $AP_{ij}$ loaded into memory location C4 is delivered by outputs 101a of circuit 1 to address inputs 222 of the address string memory 22. Addresses $AP_{i1}$, $AP_{i,j-1}$, $AP_{ij}$ and $AP_{i,J-1}$ delivered to address inputs 222 are shown on the last line but one in FIG. 5.

Control signal SC8, shown on the last line of FIG. 5, controls writing of addresses $AP_{i2}, \ldots AP_{ij}, \ldots AP_{iJ}$ in the locations of memory 22, with addresses $AP_{i1}, \ldots AP_{i,j-1}, \ldots AP_{i,J-1}$ respectively. Addresses $AP_{i2}$ to $AP_{i,J-1}$ are written in memory 22 on reception of rising edges of write pulses at "1" of the signal SC8. Signal SC8 comprises no write pulse of signal SC8 during reception of a packet $PQ_{ij}$ of frame $TR_i$. A write pulse of signal SC8 during reception of a packet $PQ_{ij}$ of frame $TR_i$ occurs prior to loading of address $AP_{ij}$ in location C4 of cell $CC_i$ so that the address present at the address inputs 222 of memory 22 is then address $AP_{i,j-1}$. Address $AP_{ij}$ is presented to data inputs 221 of memory 22. When the write pulse of signal SC8 occurs, address $AP_{ij}$ is written in the location with address $AP_{i,j-1}$ of memory 22.

Figure 1:
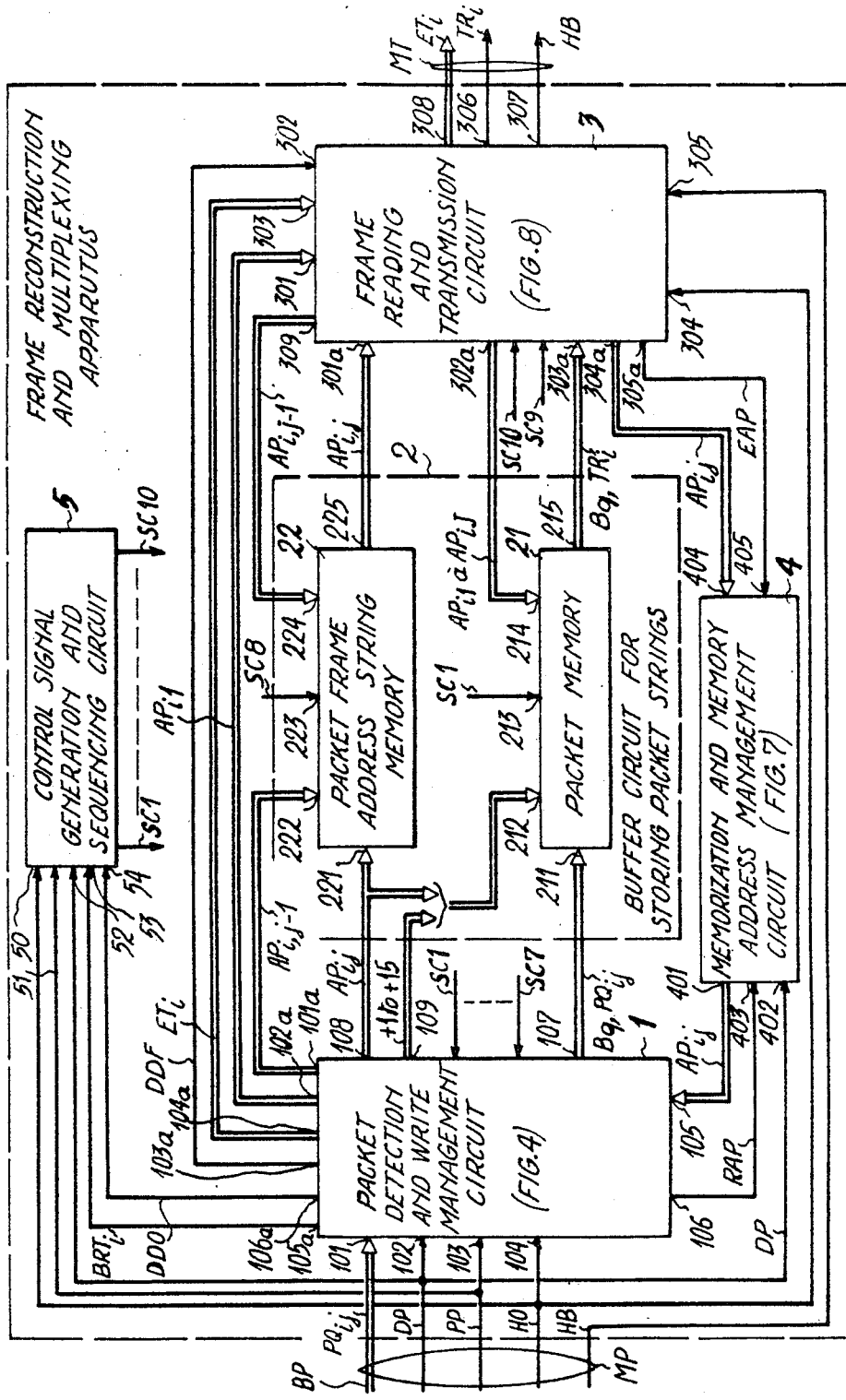
FIG. 1 is a block diagram of a frame reconstruction and multiplexing apparatus according to the invention.

A 3-input AND gate 13ET is used in circuit 1 to produce the RAP packet acknowledgment signal supplied via output 106 of circuit 1 to input 402 of the memorization and memory address management circuit 4 (FIG. 1). A first input of gate 13ET receives the clock signal HO via an inverter 1IN. Second and third inputs of the 13ET gate receive the signal PV delivered by output 165 of circuit 13 and control signal SC7 respectively. The signal RAP is used in circuit 4 for read control of a FIFO type address register in which all the addresses $AP_{ij}$ of the memory locations available in buffer circuit 2 are stored, before being supplied to circuit 1.

A preferred embodiment of the memorization and memory address management circuit 4 is shown in FIG. 7. It concerns dynamic management of packet memory 21 addressed by addresses with n bits and containing N packet memory locations, where N is such that $N \leq 2^n$.

Circuit 4 chiefly comprises an initialization circuit 41, a modulo-N binary counter 42 and a memory address register 43.

The function of circuit 41 is, at startup of the apparatus according to the invention, to produce control signals SD1 and SD2 which are sent to counter 42. Signal SD1 is supplied to a reset input 421 of counter 42 and controls initialization and incrementation of counter 42 from value 0. Signal SD2 indicates the end of the first complete counting cycle by counter 42 following startup of the apparatus according to the invention. Signal SD2 is supplied to a loading control input 422 of counter 42. Circuit 41 comprises parallel inputs 413 receiving the addresses of n bits $AP_{ij}$ supplied by parallel outputs 423 of counter 42, connected to outputs 410 of circuit 41, in order to detect a maximum address equal to N-1 delivered by counter 42 at the end of the first counting cycle.

Parallel inputs 424 of counter 42 receive the value to be loaded into counter 42 when it is working as a buffer-register. Provided that the state of signal SD2 applied to the loading control input 422 of counter 42 is correct, the value applied to inputs 424 is loaded into counter 42 on a rising edge of the signal DP applied to a clock input 425 of counter 42, via input 402 of circuit 4. The value loaded is supplied by parallel outputs 423 of counter 42 working as a register.

Register 43 is of the FIFO type; through parallel inputs 431, via inputs 404, it receives the addresses of n bits $AP_{ij}$ of the available memory locations. The write control signal EAP received at input 405 of circuit 4 is supplied to a first input of a 2-input AND gate 44. A D flip-flop 45 receives the signals FTT and LF supplied by comparator 345 of circuit 33 and by flip-flop 334 of circuit 34 (FIG. 8) at a clock input CK and a set input S respectively. A data input D of flip-flop 45 receives a logic level "0". Flip-flop 45 supplies a signal validating the signal EAP by a Q output. This validation signal is applied to a second input of AND gate 44. An output of AND gate 44 is connected to a write control input 432 of register 43. Register 43 memorizes the addresses $AP_{ij}$ of the available memory locations supplied by circuit 3, in chronological order of arrival. The first address $AP_{ij}$ memorized in register 43 is delivered by parallel outputs 433 of register 43 to inputs 424 of counter 42 when the signal RAP at "1" is sent, via input 403 of circuit 4, to a read control input 434 of register 43.

At startup of the apparatus according to the invention, the N packet memory and address word locations of memories 21 and 22 are available. Counter 42 is set to "0" by signal SD1. Signal SD2 is inactive. Counter 42 is incremented by one unit at each rising edge of the beginning of packet signal DP. It thus delivers N addresses $AP_{ij}$, and frames $TR_i$ are loaded into memory 21. At the same time, register 43 receives from circuit 3 addresses $AP_{ij}$ of the memory locations which are freed by transmission of reconstructed packet frames over medium MT. When initialization circuit 41 detects the maximum address equal to N-1 sent by counter 42, the loading control signal SD2 becomes active. Counter 42 then works as a buffer-register. Addresses $AP_{ij}$ delivered by outputs 433 of FIFO register 43 and corresponding to successively freed memory locations are loaded into counter 42 by inputs 424 and transmitted to circuit 1 under the control of signal DP by outputs 423.

A simplified embodiment of circuit 4 may only comprise one modulo-N binary counter. Circuit 4 is then not connected to circuit 3. The counter is incremented by the signal DP and cyclically delivers addresses $AP_{ij}$ from $AP_{ij}=0$ to $AP_{ij}=N-1$. This simplified embodiment of circuit 4 however requires a buffer memory 21 (FIG. 1) with a larger capacity since it is necessary to avoid write addressing a memory location which contains a prior and as yet unread packet, thus avoiding any loss of data.

Figure 8:
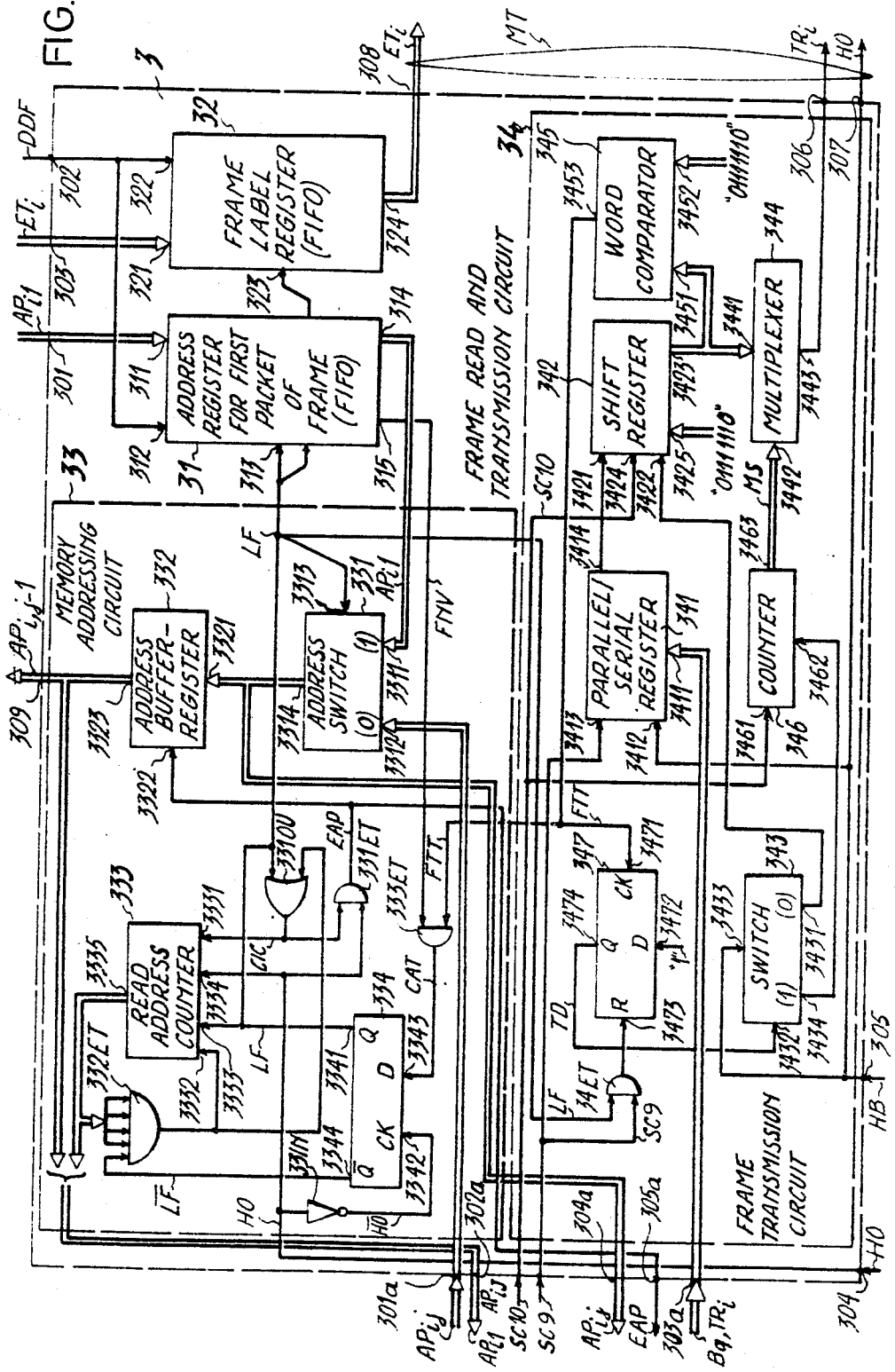
FIG. 8 is a detailed block diagram of a frame read and transmission circuit in the apparatus.

Now with reference to FIG. 8, circuit 3 comprises an address register for first packet of frame 31, a frame label register 32, a memory addressing circuit 33 and a frame transmission circuit 34.

Registers 31 and 32 are FIFO type registers. They memorize addresses $AP_{i1}$ and labels $ET_i$ respectively, transmitted in parallel by circuit 1 to inputs 301 and 303 of circuit 3. An address $AP_{i1}$ transmitted by circuit 1 is applied via inputs 301 of circuit 1 to parallel inputs 311 of register 31; an $ET_i$ label transmitted by circuit 1 is applied via inputs 303 of circuit 3 to parallel inputs 321 of register 32. The signal DDF is applied via input 302 of circuit 1 to write control inputs 312 and 322 respectively of register 31 and 32, and at state "1" controls writing of addresses $AP_{i1}$ and label $ET_i$ in registers 31 and 32. An address $AP_{i1}$ and a label $ET_i$ stored in the queue in registers 31 and 32 are delivered in parallel by registers 31 and 32 under the control of a read control signal LF delivered by the memory addressing circuit 33 and applied to inputs 313 and 324 respectively of registers 31 and 32. When the signal LF passes to "1", an address $AP_{i1}$ and a label $ET_i$ are presented to parallel outputs 314 of register 31 and parallel outputs 324 of register 32 respectively. A label $ET_i$ delivered by outputs 324 of register 32 is transmitted to the medium MT via outputs 308 of circuit 3. An address $AP_{i1}$ delivered by outputs 314 is sent to circuit 33. Via an output 315, register 31 delivers a queue status signal FNV at "0" when register 31 is empty, and at "1" otherwise. The signal FNV is applied to a first input of an AND gate, 333ET, included in circuit 33.

Memory addressing circuit 33 chiefly comprises an address switch 331, an address buffer-register 332, a read address counter 333 and a control flip-flop 334.

In order to read the first packet $PQ_{i1}$ of a frame $TR_i$ stored in memory 21, the switch 331, in the form of a multiplexer, is used to route address $AP_{i1}$ supplied by outputs 314 of register 31 to address outputs 309 and 302a of circuit 3. To read the following packets $PQ_{i2}$ to $PQ_{iJ}$, switch 331 routes addresses $AP_{i2}$ to $AP_{iJ}$, delivered to inputs 301a of circuit 3 by memory 22, to address outputs 309 and 302a respectively, as and when the packets of frame $TR_i$ are read.

Switch 331 receives address $AP_{i1}$ sent by outputs 314 of register 31 on parallel inputs 3311 and the following addresses $AP_{i2}$ to $AP_{iJ}$ sent by memory 22 on other parallel inputs 3312 connected to inputs 301a of circuit 3. A selection input 3313 of switch 331 receives the signal LF which is supplied by an output 3341 (Q) of control flip-flop 334. The signal LF at "1" orders connection of inputs 3311 of switch 331 to its parallel outputs 3314; the signal LF at "0" orders connection of inputs 3312 of switch 331 to parallel outputs 3314. Outputs 3314 of switch 331 are connected to buffer-register 332 and to outputs 304a of circuit 3 connected to inputs 404 of the memorization and memory address management circuit 4. Loading of an address $AP_{ij}$ in buffer-register 332 and its writing in FIFO register 43 of circuit 4 (FIG. 7) are performed simultaneously when controlled by a signal EAP at "1", produced by an AND gate 331ET, and applied to a loading control input 3322 of buffer-register 332 and, via output 305a of circuit 3, to input 405 of circuit 4. The address $AP_{ij}$ loaded into buffer-register 332 is supplied by parallel outputs 3323 of buffer-register 332 to address inputs 224 of memory 22 and to address inputs 214 of memory 21, via outputs 309 and 302a of circuit 3 respectively.

AND gate 331ET receives a counter initialization command CIC at a first input and the byte clock signal HO at a second input. The signal CIC is produced by a 2-input OR gate 331OU and is also delivered to a loading control input 3331 of read address counter 333.

The function of read address counter 333 is to produce address increments of $+1$ to $+15$ to be added to an address $AP_{ij}$ in order to address the packets $PQ_{ij}$ of the frame $TR_i$ being read, byte by byte. To address the first packet $PQ_{ij}$ of a frame $TR_i$, counter 333 is initialized at 2 so as not to read byte B1 of packet $PQ_{i1}$ in memory 22. Byte B1 is an open flag DO and is memorized in memory 21 at address $AP_{i1}+1$. To address the following packets $PQ_{i2}$ to $PQ_{iJ}$, counter 333 is initialized at 1 in order to read all bytes B1 to B15 for each packet.

Counter 333 is a modulo $L=16$ binary counter with an adjustable start-count value. Counter 333 is initialized at values 1 and 2 under the control of the signal CIC applied to the loading control input 3331, when a "1" state is applied to initialization inputs 3332 and 3333 respectively of counter 333. A counting clock input 3334 of counter 333 receives the clock signal HO. Parallel outputs 3335 of counter 333 deliver address increments $+2$ to $+15$ for reading packet $PQ_{i1}$ in memory 21, and $+1$ to $+15$ for reading each of the following packets $PQ_{i2}$ to $PQ_{iJ}$. The address increments delivered by outputs 3335 are delivered to inputs 214 of memory 21 via outputs 302a of circuit 3, in parallel with addresses $AP_{ij}$ supplied by outputs 3323 of buffer-register 332.

Control flip-flop 334 is a D flip-flop. This flip-flop 334 receives the complementary clock signal $\overline{HO}$ at a clock input 3342 (CK), produced by a logic inverter 33IN receiving the signal HO at its input. A data input 3343 (D) of flip-flop 334 receives a frame addressing command CAT delivered by 2-input AND gate 332ET. An inverse output 3344 ($\overline{Q}$) of flip-flop 334 delivers the signal $\overline{LF}$ which complements the signal LF. The signal LF supplied by output 3341 (Q) of flip-flop 334 is applied to input 3333 for initializing the counter 333 at 2, to a first input of OR gate 331OU, as well as to inputs 3313, 313 and 323 respectively of switch 331, register 31 and register 32. The signal $\overline{LF}$ supplied by output 3344 ($\overline{Q}$) of flip-flop 334 is applied to a first input of 5-input AND gate 332ET, with four other inputs connected to outputs 3335 of counter 333. The function of AND gate 332ET is to detect the increment $+15$ when it is delivered by outputs 3335 of counter 333. An output of AND gate 332ET is connected to input 3332 for initializing the counter 333 to 1 and to a second input of OR gate 331OU producing the initialization command signal CIC.

Figure 9:
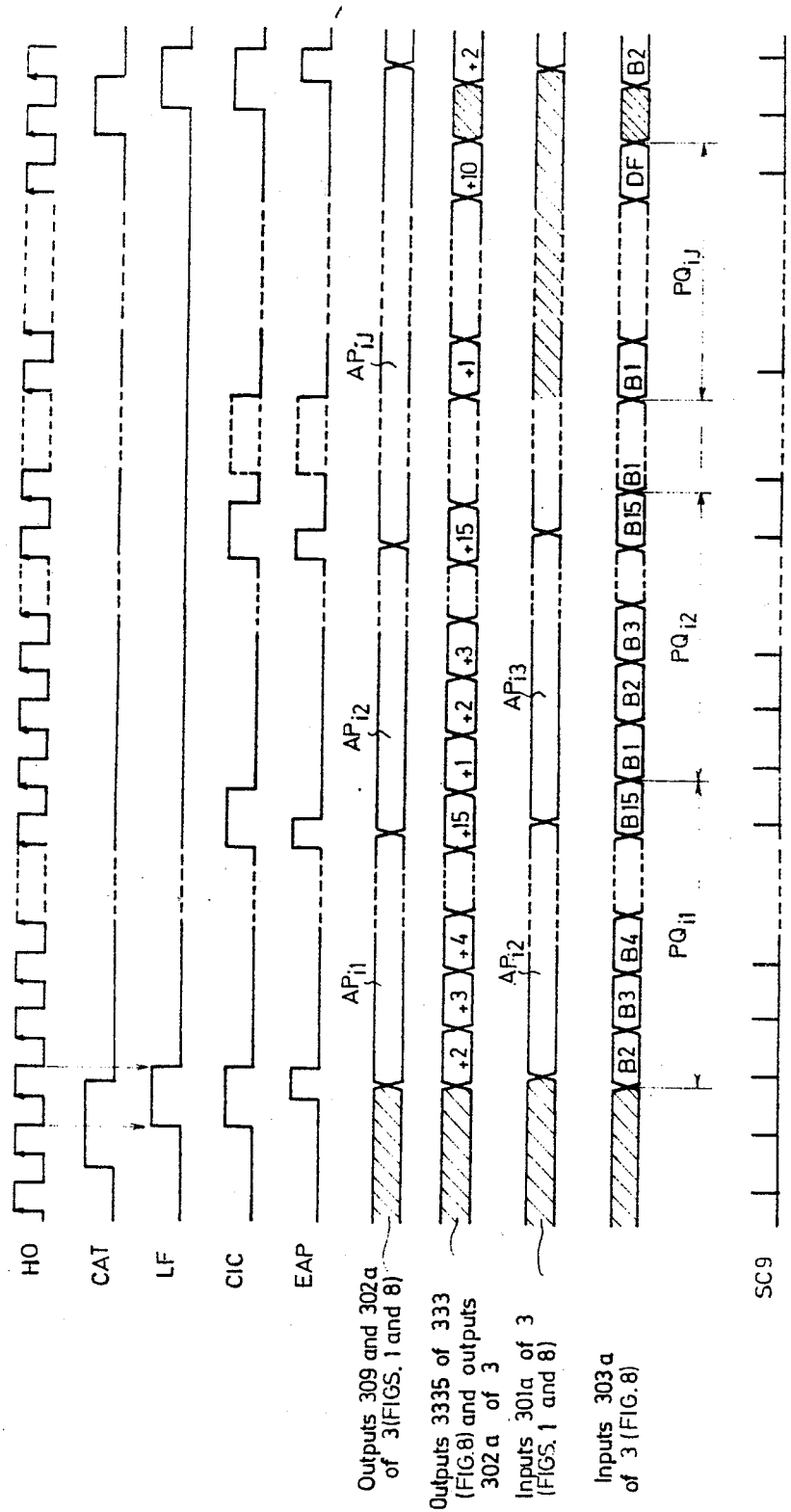
FIG. 9 is a time chart concerning read addressing of packets performed by the circuit shown in FIG. 8.

A read addressing cycle for packets $PQ_{i1}$ to $PQ_{iJ}$ of a frame $TR_i$ memorized in memory 21 is shown in FIG. 9.

The frame addressing command CAT is shown in the second line of FIG. 9. When it passes to "1", the command CAT controls triggering of consecutive reading of all packets $PQ_{i1}$ to $PQ_{iJ}$ of a frame $TR_i$. The command CAT is produced by 2-input AND gate 333ET (FIG. 8). On a first input, gate 333ET receives the signal FNV supplied by register 31, and on a second input, an signal FTT indicating end of transmission of frame and produced in frame transmission circuit 34. The command CAT at "1" indicates on the one hand that at least one complete packet frame is written in memory 21 and is waiting to be read (FNV="1") and on the other that circuit 34 is available for transmission over medium MT of a new packet frame to be read in memory 21 (FTT="1"). The state "1" of the command CAT is written in flip-flop 34 at a falling edge of the clock signal HO and determines the state "1" of the signal LF. The signal LF is shown on the third line of FIG. 9. The state "1" of the signal LF controls transmission of an address $AP_{i1}$ from FIFO register 31 to inputs 3321 of buffer-register 332 and of a corresponding label $ET_i$ from FIFO register 32 to outputs 308 of circuit 3. At the same time, the signal CIC, shown in the fourth line of FIG. 9, and dependent on the signal LF, passes to "1". The signal EAP=CIC.HO, shown in the fifth line of FIG. 9, passes to "1" after the signal CIC, at a rising edge of the signal HO, also controlling acceptance of the state "1" of the signal CIC at 2-initializing-input 3333 of counter 333, and then initialization at 2 of counter 333. The rising edge of the signal EAP at "1" controls loading of address $AP_{i1}$ into buffer-register 332, as shown on the sixth line of FIG. 9. Via outputs 309 of circuit 3, address $AP_{i1}$ is applied to address inputs 224 of memory 22 and, via outputs 302a of circuit 3, to address inputs 214 of memory 21 in parallel with the increment +2 supplied by counter 333. Following their read addressing, as shown in the eighth and ninth lines of FIG. 9, memories 22 and 21 respectively deliver address $AP_{i2}$ to inputs 301a of circuit 3 and, via inputs 303a of circuit 3, byte B2 of packet $PQ_{i1}$ to frame transmission circuit 34.

In general, reading of memories 22 and 21 by circuit 3 is controlled by falling edges of the write/read command signal SC8 and by falling edges of write/read command signal SC1, their respective writing by circuit 1 being controlled by rising edges of these same signals (FIGS. 1 and 5).

The signal FTT supplied by the frame transmission circuit 34 passes to "0" following reception of byte B2 of packet $PQ_{i1}$ by circuit 34 and then command CAT=FTT.FNV is at "0". The state "0" of the signal CAT is accepted by flip-flop 334 after a following falling edge of the signal HO. The signals LF, CIC and EAP are then at "0". The read address counter 333 is incremented by one unit from 2, in response to each following rising edge of the signal HO, until it reaches 15.

The successive increments delivered by counter 333 are shown on the seventh line of FIG. 9. Addresses $AP_{i1+2}$, $AP_{i1+3}$, ... $AP_{i1+15}$ are thus applied in turn to read address inputs 214 of memory 21 and circuit 34 receives bytes B2, B3, ... B15 of packet $PQ_{i1}$ via inputs 303a of circuit 3.

When counter 333 reaches 15, the signal LF being at "0", AND gate 332ET delivers a state "1" to 1-initializing-input 3332 of counter 333, and to the second input of OR gate 331OU. The signals CIC and EAP=CIC.HO pass to "1". Buffer-register 332 is loaded, under the control of the signal EAP="1" by address $AP_{i2}$ present at inputs 301a of circuit 3 and applied, via address switch 331 (LF=0) to inputs 3321 of buffer-register 332. Counter 333 is initialized at 1 at a rising edge of the signal HO following the state "1" applied to inputs 3331 and 3332 of counter 333. Circuit 3 thus reads packet $PQ_{i2}$ starting from byte B1. The following packets $PQ_{i3}$ to $PQ_{i,J-1}$ are read in the same way as packet $PQ_{i2}$. The last packet $PQ_{iJ}$ of frame $TR_i$ comprises an end flag DF which is detected by circuit 34. In FIG. 9, the flag DF is shown as an example as being byte B10 of packet $PQ_{iJ}$. When the flag DF is detected, the signal FTT passes to "1", after which the command CAT passes to "1", provided that registers 31 and 31 are not empty (FNV="1"). The state "1" of the command CAT is written in flip-flop 334 and triggers consecutive reading of the packets of another frame.

Frame transmission circuit 34, shown in FIG. 8, chiefly comprises a parallel loading and serial output register 341, a shift register 342, a switch 343, a multiplexer 344, a binary word comparator 345, a binary counter 346, and a flip-flop 347.

Figure 10:
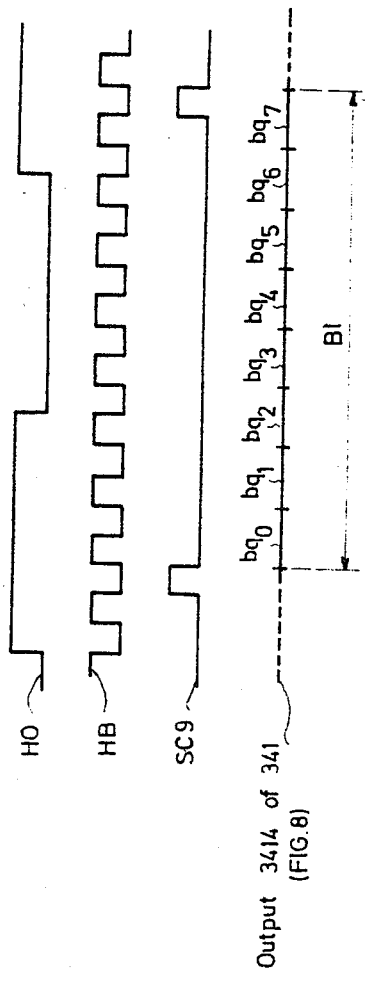
FIG. 10 is a time chart concerning parallel-serial conversion of a byte performed in a frame transmission circuit in the apparatus.

Parallel data inputs 3411 of parallel/serial register 341 receive the packet bytes transmitted by memory 21, via inputs 303a of circuit 3. A clock input 3412 of register 341 is connected to input 305 of circuit 3 and receives the bit clock signal HB. Control signal SC9, shown on the last line of FIG. 9 is applied to a loading control input 3413 of register 341. Signal SC9 is a periodic pulse signal with the same period as the clock signal HO, but delayed in relation to it by one period of signal HB. A byte Bq of a packet $PQ_{ij}$ presented at inputs 3411 of register 341 is loaded into register 341 when a pulse at "1"/ of signal SC9 occurs. Bits $bq_0$ to $bq_7$ of loaded byte Bq are then delivered in turn by a serial output 3414 of register 341, at the rate of signal HB, to a data input 3421 of shift register 342. The signals HO, HB and SC9, as well as bits $bq_0$ to $bq_7$ transmitted by serial output 3414 of register 341, are shown in FIG. 10.

Shift register 342 has a capacity of one byte. Byte Bq transmitted bit by bit by parallel-serial register 341 to input 3421 is loaded at the rate of signal HB into shift register 342. The signal HB is supplied to a shift control input 3422 of register 342 by an output 3431 of switch 343 when a state "0" is applied to a selection input 3432 of switch 343. Switch 343 receives the signal HB at an input 3433 via input 305 of circuit 3. The byte loaded into register 342 is supplied by parallel outputs 3423 of register 342 to parallel inputs 3451 and 3441 of comparator 345 and multiplexer 344. A parallel loading control input 3424 receives control signal SC10. Signal SC10 is an initialization command; it is also applied to a reset input 3461 of counter 346. At switching on, the SC10 signal presents a brief pulse at "1" which resets counter 346 and loads binary combination "01111110" into register 342, corresponding to an end flag DF. This binary combination "01111110"=DF is memorized in a hardwired ROM and applied to parallel loading inputs 3425 of register 342.

One of the eight bits applied to inputs 3441 of multiplexer 344 is selected by a binary bit selection word MS, having three bits, applied to selection inputs 3442 of multiplexer 344. The bit selected by the MS word is transmitted by an output 3443 of multiplexer 344 in medium MT, via output 306 of circuit 3.

The function of comparator 345 is to detect the end flag DF of a frame being transmitted. Comparator 345 receives binary combination "01111110"=DF memorized in a hardwired memory, at parallel inputs 3452. Through an output 3453, comparator 343 supplies the end of frame transmission signal FTT. The signal FTT passes to "1" when an end flag DF="01111110" is supplied by parallel outputs 3423 of register 342. The signal FTT is sent to memory addressing circuit 33 and to a clock input 3472 (CK) of flip-flop 347.

Flip-flop 347 is a D flip-flop. A data input 3472 (D) of flip-flop 347 is wired at state "1". A reset input 3473 (R) of flip-flop 347 is connected to an output of AND gate 34ET, which has two inputs receiving the signals SC9 and LF respectively. Flip-flop 347 delivers a flag transmission command TD by an output 3474 (Q).

The function of the switch 343 is to route the clock signal HB to clock input 3422 of shift register 342 or to a clock input 3462 of counter 346. An output 3434 of switch 343 is connected to clock input 3462 of counter 346 and supplies it with the signal HB when selection input 3432 of switch 343 receives the signal TD at state "1".

Counter 346 is a modulo-8 counter. It delivers the MS bit selection word through parallel outputs 3463 to selection inputs 3442 of multiplexer 344.

At the end of transmission of a frame $TR_i$ on medium MT, shift register 342 contains the end flag DF="01111110". The flag DF supplied by outputs 3423 of register 342 is applied to inputs 3451 of comparator 345 and the signal FTT previously at "0" passes to "1". This passage to "1" of the signal FTT controls writing of state "1" in flip-flop 347 applied to data input 3472(D). Output 3474 (Q) of flip-flop 347 then delivers the command TD at "1" to selection input 3432 of switch 343. This state "1" controls routing of the signal HB from input 3433 to clock input 3462 of counter 346, which then supplies words MS with consecutive values 0 to 7 cyclically at the rate of the signal HB. The words MS individually and successively select each of the bits of the flag DF delivered to inputs 3441 of multiplexer 344 by shift register 342. The flag DF is transmitted in serial form over the medium MT by output 3443 of multiplexer 344. If FIFO registers 31 and 32 are empty (FNV="0"), that is no complete packet frames are stored in memory 21, the flag DF is continuously transmitted on the medium MT until transmission of a frame is possible.

When circuit 33 triggers reading of a packet frame $TR_i$ in packet memory 21, the signal LF applied to the second input of AND gate 34ET passes to "1" and opens AND gate 34ET. Flip-flop 347 is then reset when a pulse at "1" of signal SC9 occurs, after the signal LF passes to "1". The command TD at "0" controls routing of clock signal HB in switch 343 to clock input 3422 of shift register 342. Counter 346 no longer receives the signal HB previously supplied by switch 343, and counting is suspended. Counter 346 thus supplies a word MSa which selects one of inputs 3441 of multiplexer 344 for the entire duration of transmission of the frame $TR_i$ on medium MT. At the rate of signal HB, each of the bits loaded into shift register 342 is transmitted to selected input 3441 of multiplexer 344 by the corresponding output 3423 of register 342.

When the flag DF of the frame $TR_i$ being transmitted on medium MT is detected by comparator 345, the command TD passes to "1". The signal HB is routed to clock input 3462 of counter 346. The shift is interrupted in register 342 and counting resumes in counter 346 starting from the word MSa.

Figure 11:
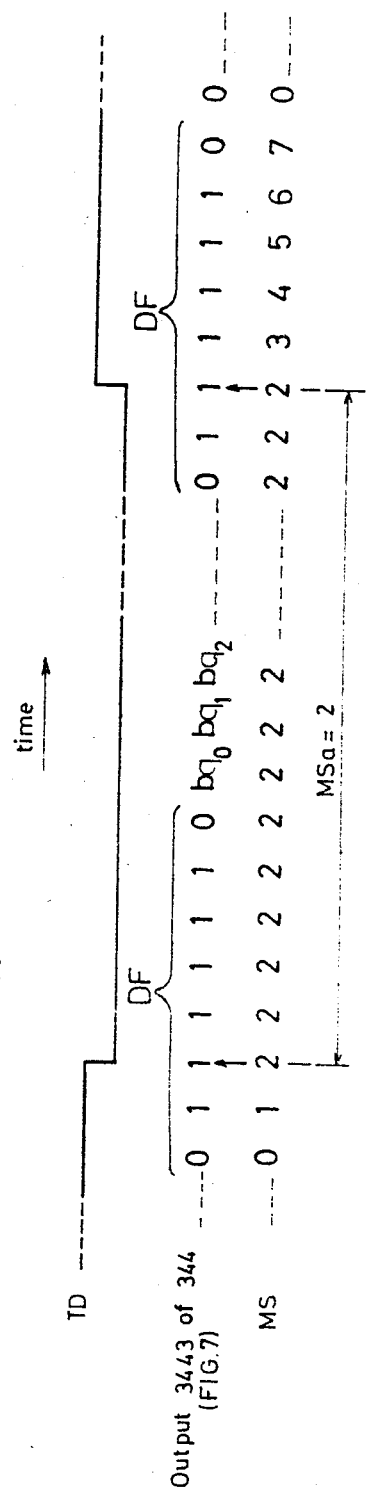
FIG. 11 shows transmission of flags surrounding each of the frames transmitted by the apparatus.

As shown in FIG. 11, the flags DF are transmitted in full over the medium MT by output 3443 of multiplexer 344. They are not truncated transitions of the command TD.

Transition from "1" to "0" by the command TD preceding the beginning of transmission of a frame $TR_i$ over medium MT is shown on the first line, left, in FIG. 11. This transition for example occurs on transmission by output 3443 of multiplexer 344 of a third bit, equal to "1", of a flag DF, in relation to an MSB first bit equal to "0". The value of the MS word is then 2, hence MSa=2. A low-order portion "011" of the flag DF has been transmitted over medium MT before transition of the command TD to "0". The remaining high-order portion of the flag DF "11110" to be transmitted is received at input 3441 of multiplexer 344, selected by word MSa=2, at the rate of the signal HB controlling the shift in register 342. The transmission of bits $bq_0$, $bq_1$, $bq_2$ ... of frame $TR_i$ follows transmission of the high-order portion "11110" of the flag DF over medium MT. At the end of transmission of frame $TR_i$, the flag DF is detected by comparator 345 at the end of its loading in shift register 342 and the command TD passes to "1". A low-order portion "011" of the flag DF has already been transmitted on medium MT before transition of the command TD to "1". Counter 346 resumes counting from word MSa=2 and in turn delivers words MS=3, 4, 5, 6, 7 which select the following inputs 3441 of multiplexer 344. The remaining high-order portion "11110" of the flag DF is thus transmitted on medium MT.

What we claim is:

1. A receiving apparatus responsive to received asynchronous packets for reconstructing frames including the received asynchronous packets, each frame including a variable number of packets having the same label, said frames being delivered in multiplexed form to the receiving apparatus, said apparatus comprising:

a first memory having a determined number of first locations for momentarily memorizing said received asynchronous packets, said first locations being addressed respectively by first addresses, a second memory having a number of second locations equal to the number of locations of said first memory for momentarily memorizing strings of addresses by memorized incoming packets corresponding respectively to said frames, said second locations being respectively associated with said first locations and being addressed respectively by second addresses, means for detecting free location couples in said memories and deriving the corresponding first and second addresses in response to reception of said packets, each location couple including a first location and the corresponding second location, writing means responsive to said received packets and said first and second addresses derived by said free location couple detecting means, said writing means controlling writings of said packets in said first memory and writings of the corresponding first addresses in the corresponding address strings memorized in said second memory, and for delivering string addresses corresponding to frames fully written in said first memory, and reading means receiving said string addresses for controlling readings of said fully written frames and deriving said frames in multiplexed form, the first addresses for the reading of a fully written frame memorized in said first memory being recovered by said reading means consecutively to prior readings of the corresponding address string memorized in said second memory and the frame being read packet by packet as the first addresses are recovered in the second memory.

2. The apparatus of claim 1 wherein said received packets include interlaced frames and comprise a predetermined number of words, said received packets comprising first words constituting labels identifying the frame to which said received packets belong, second words in said first received packets belonging to said interlaced frames being identical to a predetermined beginning of a frame pattern, and last received packets belonging to said interlaced frames each containing a predetermined end of frame pattern, and wherein said writing means comprises:

first means for detecting said labels in said received packets, second means for detecting said beginning and end patterns in said received packets, and a number of control memory cells allocated respectively to said interlaced frames and receiving said first addresses, the cell allocated to a frame being write addressed in response to the label detected in said received packets of said frame, and storing a first address of a first location in said first memory in which the first packet of said frame is stored in response to said beginning pattern detected in said first packet, and another first address of another first location in said first memory in which a received packet of said frame is written in response to the label detected in said received packet, said another first address being read in said cell to act as a write addressing second address of said second memory in response to the next detected received packet of said frame, said first address of said first location storing said first frame packet being read in said cell and being transmitted with said frame label to said reading means in response to said end pattern detected in said last packet of said frame.

3. The apparatus of claim 2, wherein the cell allocated to a frame stores each word of a received packet of said frame in response to said label detected in said received packet and stores a state bit determined by said second detecting means, said state bit having a (a) first state as long as said first packet of said frame is not detected and written in said first memory and (b) a second state in response to said beginning pattern detected in said last packet of said frame, said second detecting means comparing each word of said received packet of said frame with said beginning pattern when said state bit is at said first state, and comparing the combination of each of said words of said received packet and said word stored in said cell with permutations of said end pattern when said state bit is at said second state.

4. The apparatus of claim 2, wherein said first packet words constituting said labels are not written in said first memory.

5. The apparatus of claim 1, wherein said reading means comprising:
   means for storing said first addresses of said first locations of said first memory having stored said first packets of completely written frames,
   read addressing means for successively reading said addresses written in said second location of said second memory corresponding to said first locations of said first memory having stored said packets of said completely written frame, starting from said second location having stored said first address of said first location having stored said second packet of said frame, to read said packets of said frame in said first memory successively by means of said first address of said first packet of said frame stored in said storing means and by means of said addresses read consecutively in said second memory, and
   means for serializing and transmitting said frames from said packets read in said first memory by inserting predetermined packing words between said frames transmitted.

6. The apparatus of claim 5, wherein the read addressing means comprises
   means for reading said first address stored in said storing means for said first packet of said completely written frame in response to a signal delivered by said memorizing means when said memorizing means contains at least one first location address for said first packet of said frame and in response to a signal delivered by said serializing and transmitting means when they are to transmit packing words, and
   means for reading the address of each first location of said first memory containing a packet of said frame, comprising means for read addressing said first location of said first memory having stored said first packet of said completely written frame in said first memory, means for read addressing said first location of said second memory having stored said address of said first location containing said packet when the packet of said frame preceding said packet is read, and means receiving said first location address previously read in said second memory for read addressing said first location of said first memory having stored said packet when said second location of said second memory having stored said address of said first location containing the packet following said packet is read.

7. The apparatus of claim 6, wherein said means for reading said first location having stored said first packet of said completed frame comprises means for inhibiting reading of the second word of said first packet.

8. The apparatus of claim 5, wherein said storing means stores labels of each completely written frame simultaneously with said first address of said first location storing said first packet of said frame to deliver said labels in parallel with said read packets of said frame.

9. The apparatus of claim 5, wherein said serializing and transmitting means comprises
   a first shift register for consecutively storing the words of said packets of a frame read in said first memory and a second shift register for analyzing said packet word and for storing a packing word between reading frames,
   a multiplexer with inputs connected to be responsive to outputs of said second shift register for multiplexing said frames read with said packing words,
   a comparator connected to said second shift register for comparing the contents of said second register with an end of frame pattern to detect said end pattern in each frame read, and
   means connected to said read addressing means and to said comparator for writing said packing word in said second shift register in response to said end pattern being detected in a read frame and for reading said bits of said packing word written by cyclically selecting multiplexer inputs between said read frame, and for consecutively writing said packet word stored in said first register into said second shift register and reading said bits of said packet word written by selecting, throughout reading of said frame, a multiplexer input determined according to the number of packing word bits preceding said read frame and still to be transmitted when said first packet of said frame is read in said first memory.

10. The apparatus of claim 1, wherein said detecting means for free location couples comprises means for cyclically supplying said first addresses of said first locations of said first memory to said writing means in response to said respective detected received packets.

11. The apparatus of claim 1, wherein said detecting means for free location couples comprises means for supplying said first addresses of said first locations of said first memory to writing means in response to detected received packets of a number equal to said number of first locations in said first memory after startup of the apparatus, free location address means for storing the first addresses of the first locations of said first memory read by said reading means, and means for detecting a last location address supplied for reading one of said location addresses stored in said free location address means in response to each of the received packets following the received packet written at said last location address supplied.

12. An apparatus receiving from a single medium incoming packets of fixed length belonging to interlaced frames of various origins, the incoming packets including any non-zero number of bits for reconstructing multiplexed frames, said incoming packets comprising a predetermined number of words, said incoming packets comprising first words constituting labels identifying the frame to which said packets belong, second words in said first incoming packets belonging to said interlaced frames being identical to a predetermined beginning of a frame pattern, and last incoming packets belonging to said interlaced frames each containing a predetermined end of frame pattern, comprising:

a first memory having a determined number of first locations for momentarily storing said incoming packets of said interlaced frames, means for establishing first addresses of said first locations, a second memory having a number of second locations at least equal to said first location number for storing said first addresses of the first locations of the stored incoming packets, means for establishing second addresses of said second locations, writing means detecting said incoming packets belonging to said interlaced frame for writing each detected incoming packet in one of said first locations and writing the first address of said one first locations in one second location, said second location having a second address equal to the first address of another first location where another detected incoming packet belonging to the same frame and preceding said detected incoming packet in said frame has been stored, said writing means comprising:

first means for detecting said labels in said incoming packets, second means for detecting said beginning and end patterns in said incoming packets, and a number of control memory cells allocated respectively to said interlaced frames and receiving said first addresses, the cell allocated to a frame being write addressed in response to the label detected in said incoming packets of said frame, and memorizing a first address of a first location in said first memory in which the first packet of said frame is memorized in response to said beginning pattern detected in said first packet, and another first address of another first location in said first memory in which an incoming packet of said frame is written in response to the label detected in said incoming packet, said another first address being read in said cell to act as a write addressing second address of said second memory in response to the next detected incoming packet of said frame, said first address of said first location memorizing said first frame packet being read in said cell and being transmitted with said frame label to said reading means in response to said end pattern detected in said last packet of said frame, and reading means receiving the first address of said one first locations having been stored as a first detected incoming packet of a frame that has been completely written in said first memory, said reading means successively reading said addresses written in said second locations corresponding to said first locations storing said packets of said frame, the successively read addresses starting from the second location with a second address equal to said first address of said first location where there has been stored a second detected incoming packet of said frame, said reading means reading said packets in said first locations for serial transmission of each bit of said frame read in said first locations in chronological order that said packets of said frame have been written.

13. An apparatus as claimed in claim 12, wherein the cell allocated to a frame memorizes each word of an incoming packet of said frame in response to said label detected in said incoming packet, memorizes a state bit determined by said second detecting means, said state bit having a first state as long as said first packet of said frame is not detected and written in said first memory, and having a second state in response to said beginning pattern detected in said last packet of said frame, said second detecting means comparing each word of said incoming packet of said frame with said beginning pattern when said state bit is at said first state, and comparing the combination of each of said words of said incoming packet and said word memorized in said cell with permutations of said end pattern when said state bit is at said second state.

14. An apparatus as claimed in claim 12, wherein said first packet words constituting said labels are not written in said first memory.

15. An apparatus receiving from a single medium incoming packets of fixed length belonging to interlaced frames of various origins, the incoming packets including any non-zero number of bits for reconstructing multiplexed frames, comprising:

a first memory having a determined number of first locations for momentarily storing said incoming packets of said interlaced frames, means for establishing first addresses of said first locations, a second memory having a number of second locations at least equal to said first location number for storing said first addresses of the first locations of the stored incoming packets, means for establishing second addresses of said second locations, writing means detecting said incoming packets belonging to said interlaced frame for writing each detected incoming packet in one of said first locations and writing the first address of said one first locations in one second location, said second location having a second address equal to the first address of another first location where another detected incoming packet belonging to the same frame and preceding said detected incoming packet in said frame has been stored, and reading means receiving the first address of said one first locations having been stored as a first detected incoming packet of a frame that has been completely written in said first memory, said reading means successively reading said addresses written in said second locations corresponding to said first locations storing said packets of said frame, the successively read addresses starting from the second location with a second address equal to said first address of said first location where there has been stored a second detected incoming packet of said frame, said reading means reading said packets in said first locations for serial transmission of each bit of said frame read in said first locations in chronological order that said packets of said frame have been written, said reading means comprising:

means for memorizing said first addresses of said first locations of said first memory having memorized said first packets of completely written frames, read addressing means for successively reading said addresses written in said second locations of said second memory corresponding to said first locations of said first memory having memorized said packets of said completely written frame, starting from said second location having memorized said first address of said first location having memorized said second packet of said frame, in order to read said packets of said frame in said first memory successively by means of said first address of said first packet of said frame memorized in said memorizing means and by means of said addresses read consecutively in said second memory, and means for serializing and transmitting said frames from said packets read in said first memory by inserting predetermined packing words between said frames transmitted.

16. An apparatus as claimed in claim 15, wherein the read addressing means comprises means for reading said first address memorized in said memorizing means of said first packet of said completely written frame in response to a signal delivered by said memorizing means when said memorizing means contains at least one first location address for said first packet of said frame and in response to a signal delivered by said serializing and transmitting means when they are to transmit packing words, and means for reading the address of each first location of said first memory containing a packet of said frame, comprising means for read addressing said first location of said first memory having memorized said first packet of said completely written frame in said first memory, means for read addressing said location of said second memory having memorized said address of said first location containing said packet when the packet of said frame preceding said packet is read, and means receiving said first location address previously read in said second memory for read addressing said first location of said first memory having memorized said packet when said second location of said second memory having memorized said address of said first location containing the packet following said packet is read.

17. An apparatus as claimed in claim 16, wherein said means for reading said first location having memorized said first packet of said completed frame comprises means for inhibiting reading of the second word of said first packet.

18. An apparatus as claimed in claim 15, wherein said memorizing means memorizes labels of each completely written frame simultaneously with said first address of said first location memorizing said first packet of said frame in order to deliver said labels in parallel with said read packets of said frame.

19. An apparatus as claimed in claim 15, wherein said serializing and transmitting means comprises a first shift register for consecutively memorizing the words of said packets of a frame read in said first memory and a second shift register for analyzing said packet words and for memorizing a packing word between reading frames, a multiplexer with inputs connected to outputs of said second shift register for multiplexing said frames read with said packing words, a comparator connected to said second shift register for comparing the content of said second register with an end of frame pattern in order to detect said end pattern in each frame read, and means connected to said read addressing means and to said comparator for writing said packing word in said second shift register in response to said end pattern detected in a read frame and for reading said bits of said packing word written by cyclically selecting multiplexer inputs between said read frame, and for consecutively writing said packet word memorized in said first register into said second shift register and reading said bits of said packet word written by selecting, throughout reading of said frame, a multiplexer input determined according to the number of packing word bits preceding said read frame and still to be transmitted when said first packet of said frame is read in said first memory.

20. An apparatus receiving from a single medium incoming packets of fixed length belonging to interlaced frames of various origins, the incoming packets including any non-zero number of bits for reconstructing multiplexed frames, comprising:

a first memory having a determined number of first locations for momentarily storing said incoming packets of said interlaced frames, means for establishing first addresses of said first locations, a second memory having a number of second locations at least equal to said first location number for storing said first addresses of the first locations of the stored incoming packets, means for establishing second addresses of said second locations, writing means detecting said incoming packets belonging to said interlaced frame for writing each detected incoming packet in one of said first locations and writing the first address of said one first locations in one second location, said second location having a second address equal to the first address of another first location where another detected incoming packet belonging to the same frame and preceding said detected incoming packet in said frame has been stored, said establishing means comprising means for cyclically supplying said first addresses of said first locations of said first memory to said writing means in response to said respective detected incoming packets; and reading means receiving the first address of said one first locations having been stored as a first detected incoming packet of a frame that has been completely written in said first memory, said reading means successively reading said addresses written in said second locations corresponding to said first locations storing said packets of said frame, the successively read addresses starting from the second location with a second address equal to said first address of said first location where there has been stored a second detected incoming packet of said frame, said reading means reading said packets in said first locations for serial transmission of each bit of said frame read in said first locations in chronological order that said packets of said frame have been written.

21. An apparatus receiving from a single medium incoming packets of fixed length belonging to interlaced frames of various origins, the incoming packets including any non-zero number of bits for reconstructing multiplexed frames, comprising:

a first memory having a determined number of first locations for momentarily storing said incoming packets of said interlaced frames, means for establishing first addresses of said first locations, a second memory having a number of second locations at least equal to said first location number for storing said first addresses of the first locations of the stored incoming packets, means for establishing second addresses of said second locations, writing means detecting said incoming packets belonging to said interlaced frame for writing each detected incoming packet in one of said first locations and writing the first address of said one first locations in one second location, said second location having a second address equal to the first address of another first location where another detected incoming packet belonging to the same frame and preceding said detected incoming packet in said frame has been stored, said establishing means comprising means for supplying first addresses of said first locations of said first memory to writing means in response to detected incoming packets of a number equal to said number of first locations in said first memory after startup of the apparatus, free location address means for memorizing the first addresses of the first locations of said first memory read by said reading means, and means for detecting a last location address supplied for reading one of said location addresses memorized in said free location address means in response to each of the incoming packets following the incoming packet written at said last location address supplied, and reading means receiving the first address of said one first locations having been stored as a first detected incoming packet of a frame that has been completely written in said first memory, said reading means successively reading said addresses written in said second locations corresponding to said first locations storing said packets of said frame, the successively read addresses starting from the second location with a second address equal to said first address of said first location where there has been stored a second detected incoming packet of said frame, said reading means reading said packets in said first locations for serial transmission of each bit of said frame read in said first locations in chronological order that said packets of said frame have been written.

* * * * *